Figure 1:
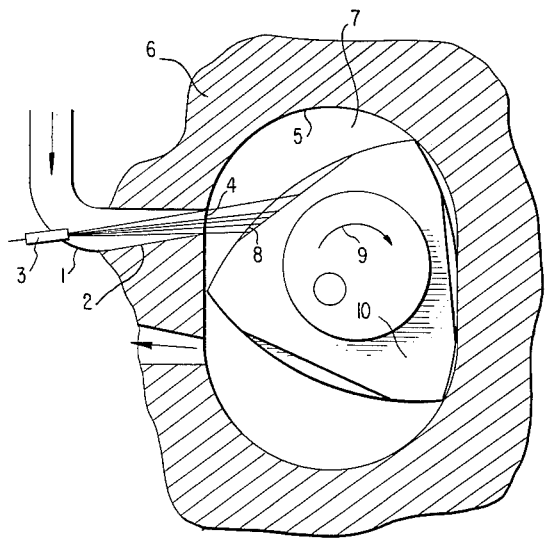

INVENTORS
WILLI SPRINGER
HEINZ LAMM

United States Patent Office 3,255,738
Patented June 14, 1966

3,255,738
ROTARY-PISTON INTERNAL COMBUSTION
ENGINE
Willi Springer, Faurndau, and Heinz Lamm, Stuttgart-
Bad Cannstatt, Germany, assignors to Daimler-Benz
Aktiengesellschaft, Stuttgart-Unterturkheim, Germany
Filed Mar. 19, 1963, Ser. No. 266,422
Claims priority, application Germany, Mar. 23, 1962,
D 38,450
4 Claims. (Cl. 123—8)

The present invention relates to a rotary-piston internal combustion engine of trochoidal construction in which the polygonal piston controls with the corners thereof the gas exchange channels.

The present invention essentially consists, in order to constitute an engine of the type mentioned hereinabove as mixture-compressing injection-type internal combustion engine, of so arranging an injection nozzle in the inlet channel or suction pipe that the fuel jet is disposed in the center longitudinal axis of the suction channel and is directed, with an open inlet cross section at the internal surface of the enclosure body, against the piston flank of the rotating piston.

By the proposed arrangement in accordance with the present invention is achieved the effect of a direct injection without the occurrence of compression losses that might otherwise occur when the radial seals of the piston run over the nozzle bores at the internal surfaces of the enclosure body. Furthermore, it is made possible by the present invention that the fuel is injected into the area of the highest air velocity. The fuel overtakes in part the air. Eddying or vortexing movements at the inlet channel rim thereby support the mixture formation. During the injection period the angle of impact of the fuel jet on the piston flank changes continuously. It thereby influences the mixture formation. Since the surface of the piston flank wetted by the fuel also changes continuously, an additional piston cooling is also achieved thereby. By a suitable choice of the commencement of the injection and matching of the injection nozzle, it is possible to achieve by the deflection of the fuel a stratification of the charge within the combustion space. Additionally, a preparation of the fuel within the suction channel is also possible.

According to a further feature of the present invention, a helically-wound sheet-metal guide member may be arranged within the suction channel and possibly within the suction pipe between the injection nozzle and the inlet cross section at the internal surface which air guide member abuts against the circumferential walls of the suction channel and the suction pipe and which leaves open an essentially cylindrical space for the passage of the fuel jet. A rotary movement is achieved by such measures in the sucked-in combustion air which initially only seizes the rim zones or the fuel jet. The core of the fuel jet, however, shoots into the suction space against the piston flank and mixes thereat with the still continuing air which rotates.

Accordingly, it is an object of the present invention to provide a rotary-piston internal combustion engine, especially of trochoidal construction, which is constructed as a mixture-compressing injection-type internal combustion engine.

Another object of the present invention resides in the provision of a rotary-piston internal combustion engine of the type mentioned hereinabove in which the effect of a direct injection is attained without compression losses.

A further object of the present invention resides in the provision of a fuel injection system for a rotary-piston internal combustion engine of the type described hereinabove which assures improved mixture preparation, provides an additional cooling of the piston surfaces and permits of stratification of the charge within the combustion space.

Another object of the present invention resides in the provision of an injection system for a rotary-piston internal combustion engine, particularly of trochoidal construction, which produces a more favorable mixture formation.

Figure 2:
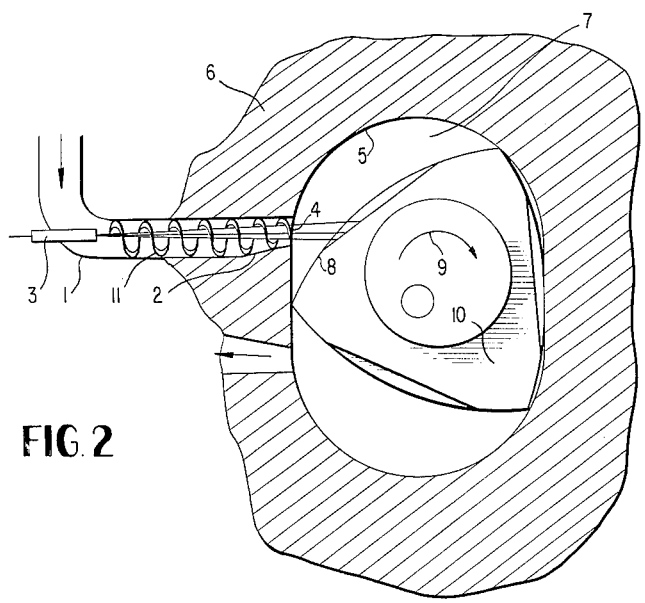

These and other objects, features and advantages of the present invention will become more obvious from the following description when taken in connection with the accompanying drawing which shows, for purposes of illustration only, two embodiments in accordance with the present invention and wherein:

FIGURE 1 is a somewhat schematic axial cross sectional view through a rotary-piston internal combustion engine in accordance with the present invention, and FIGURE 2 is a somewhat schematic axial cross sectional view of a modified embodiment of a rotary-piston internal combustion engine in accordance with the present invention.

Referring now to the drawing wherein like reference numerals are used throughout the two views to designate like parts, and more particularly to FIGURE 1, reference numeral 1 designates therein the suction pipe. The injection nozzle 3 is arranged within the suction pipe 1 ahead of the suction channel 2 of the illustrated rotary piston internal combustion engine in such a manner that with an open inlet cross section 4 at the internal surfaces 5 of the enclosure body 6 the fuel injection nozzle 3 injects fuel in the center longitudinal axis of the suction channel 2 into the suction space 7 against the flank 8 of the piston 10 rotating in the direction of arrow 9. As may be readily seen from FIGURE 1, such injection produces the effect of a direct injection. The injection takes place within the area of the largest air velocity. Since the fuel impinges continuously at a different angle against the flank 8 of the piston 10, the fuel is also reflected continuously in another direction from the piston flank 8 so that a favorable mixture formation occurs.

According to the modified embodiment of FIGURE 2, the helically wound sheet-metal air guide member 11 is arranged in the suction pipe 1 and in the suction channel 2 within the area between the injection nozzle 3 and the inlet cross section 4 at the internal surfaces 5 of the enclosure body 6. The sheet-metal air guide member 11 which, of course, may also be made of any suitable material other than sheet metal, abuts against the walls of the suction pipe 1 and of the inlet channel 2 but leaves open a cylindrical space about the center longitudinal axis of the suction channel 2 so that the fuel jet discharged from the injection nozzle 3 is not impaired by the air guide member 11. The helically guided combustion air initially seizes only the rim zones of the fuel jet. The core of the fuel jet, however, shoots through the central aperture within air guide member 11 into the suction space 7 against the flank 8 of the piston 10 and mixes thereat with the still rotating parts of the combustion air so that a favorable mixture preparation is attained.

While we have shown and described two embodiments in accordance with the present invention, it is understood that the same is not limited thereto but is susceptible of numerous changes and modifications within the spirit and scope thereof, and we, therefore, do not wish to be limited to the details shown and described herein but intend to cover all such changes and modifications as are encompassed by the scope of the appended claims.

We claim:
1. A rotary-piston internal combustion engine of trochoidal construction comprising:
  housing means forming internal surfaces provided with inlet aperture means,
  polygonal piston means rotatable within said housing means,
  suction duct means leading to the inlet aperture means, and means including injection nozzle means for inject- ing the fuel jet approximately along the center longitudinal axis of said suction duct means against the piston flank with said inlet aperture means open, and helically wound air guide means within said suction duct means between said nozzle means and said inlet aperture for imparting to the combustion air a rotary movement as it enters into the combustion space through said inlet aperture means.

2. In a rotary-piston internal combustion engine, particularly of trochoidal construction in which a polygonal piston which rotates within the housing valves with the corners thereof the gas exchange channels including a combustion air-inlet suction channel, the improvement essentially consisting of injection means located within said combustion air-inlet suction channel to constitute said internal combustion engine a mixture-compressing injection-type combustion engine, said injection means being operable to inject the fuel jet approximately centrally and parallelly to an approximately straight portion of said suction channel to create an eddying movement of the combustion air to thereby support the formation of the air-fuel mixture, said injection means injecting the fuel jet into the suction space formed by said rotating piston and said housing, and against the piston flank during a substantial portion of the period that the piston is rotating to simultaneously cool the piston with the fuel and cause the fuel jet to impinge upon the piston flank at a continuously changing angle so that the fuel is deflected by the flank at a continuously changing angle to distribute the fuel through a substantial portion of the combustion chamber.

3. In a rotary-piston internal combustion engine, particularly of trochoidal construction in which a polygonal piston which rotates within the housing valves with the corners thereof the gas exchange channels including a combustion air-inlet suction channel, the improvement essentially consisting of injection means located within said combustion air-inlet suction channel to constitute said internal combustion engine a mixture-compressing injection-type combustion engine with a direct injection effect, said injection means being operable to inject the fuel jet approximately centrally and parallelly to an approximately straight portion of said combustion air-inlet suction channel to create an eddying movement of the combustion air for supporting the formation of the air-fuel mixture, said injection means injecting the fuel jet into the suction space against the piston flank during a substantial portion of the period that the piston is rotating, to simultaneously cool the piston with the fuel and cause the fuel jet to impinge upon the piston flank at a continuously changing angle so that the fuel is deflected by the flank at a continuously changing angle to distribute the fuel throughout a substantial portion of the combustion chamber.

4. In a rotary-piston internal combustion engine, particularly of trochoidal construction in which a polygonal piston which rotates within the housing valves with the corners thereof the gas exchange channels including a suction channel, the improvement essentially consisting of injection means located within said suction channel to constitute said internal combustion engine a mixture-compressing injection-type combustion engine, said injection means being operable to inject the fuel jet substantially directly through a portion of the suction duct into the suction space against the piston flank, and means for imparting a rotary movement to the suction air passing through said portion without substantially impairing the direct fuel injection therethrough.

References Cited by the Examiner

UNITED STATES PATENTS

| 528,115 | 10/1894 | Schumm | 123—28 |
|---|---|---|---|
| 1,149,296 | 8/1915 | Scott et al. | 123—29 |
| 1,189,564 | 7/1916 | Harper | 123—29 |
| 1,328,142 | 1/1920 | Fekete. | |
| 1,391,981 | 9/1921 | Sandell | 123—29 |
| 1,725,066 | 8/1929 | Egersdorfer | 123—28 |
| 2,988,065 | 6/1961 | Wankel et al. | 123—8 |
| 3,053,238 | 9/1962 | Meurer | 123—8 |
| 3,136,302 | 6/1964 | Nallinger et al. | 123—8 |
| 3,144,006 | 8/1964 | Meurer | 123—8 |
| 3,174,466 | 3/1965 | Scherenberg | 123—8 |

FOREIGN PATENTS

| 522,427 | 3/1921 | France. |
|---|---|---|
| 1,265,070 | 5/1961 | France. |
| 518,895 | 3/1940 | Great Britain. |

SAMUEL LEVINE, *Primary Examiner.*

JOSEPH H. BRANSON, JR., *Examiner.*

F. T. SADLER, *Assistant Examiner.*